United States Patent [19]

Gove

[11] Patent Number: 4,711,799
[45] Date of Patent: Dec. 8, 1987

[54] APPARATUS AND METHOD FOR MAKING A COUNTER TOP AND PRODUCT OF SAME

[76] Inventor: Gene G. Gove, Box 636, 1237 W. 13th, Hastings, Minn. 55033

[21] Appl. No.: 869,673

[22] Filed: Jun. 2, 1986

Related U.S. Application Data

[63] Continuation of Ser. No. 560,318, Dec. 12, 1983, Pat. No. 4,608,291.

[51] Int. Cl.$^4$ .............................................. B05D 5/12
[52] U.S. Cl. ................................ 428/119; 144/134 D; 144/371; 144/355; 409/178; 409/132
[58] Field of Search ................... 51/102, 116, 170 PT; 108/27; 144/134 R, 134 D, 136 C, 126, 127, 355, 346, 371; 409/131, 132, 175, 178

[56] References Cited

U.S. PATENT DOCUMENTS

| | | | |
|---|---|---|---|
| 2,729,437 | 1/1956 | Brenner | 144/136 C |
| 3,212,541 | 10/1965 | Burrows et al. | 144/134 D |
| 3,628,579 | 12/1971 | Roche | 409/178 |
| 3,893,372 | 7/1975 | Strakeljahn | 144/134 D |
| 3,913,447 | 10/1975 | Roche | 409/178 |

OTHER PUBLICATIONS

"Talking Technical–Bullnose/Scotia Fabrication", *Corian News*, DuPont (Australia) Ltd., 168 Walker Street, North Syndey, Australia, vol. 1, No. 2, Sep. 1982.

*Primary Examiner*—W. D. Bray
*Attorney, Agent, or Firm*—Merchant, Gould, Smith, Edell, Welter & Schmidt

[57] ABSTRACT

The present invention is directed to a method and apparatus for shaping the inside corner of slabs of material comprised primarily of polymethyl methacrylate filled with alumina trihydrate. The process involves fastening a connecting slab between horizontal and vertical slabs and shaping the connecting slab with an arcuate shape which meets the flat surfaces of the horizontal and vertical slabs. The tool for the process has cutting surfaces to create the indicated inside corner shape and is used in conjunction with a base for a rotary motor router. The resulting product has a rounded inside corner which appears molded as a single piece, rather than a combination of pieces or slabs.

1 Claim, 5 Drawing Figures

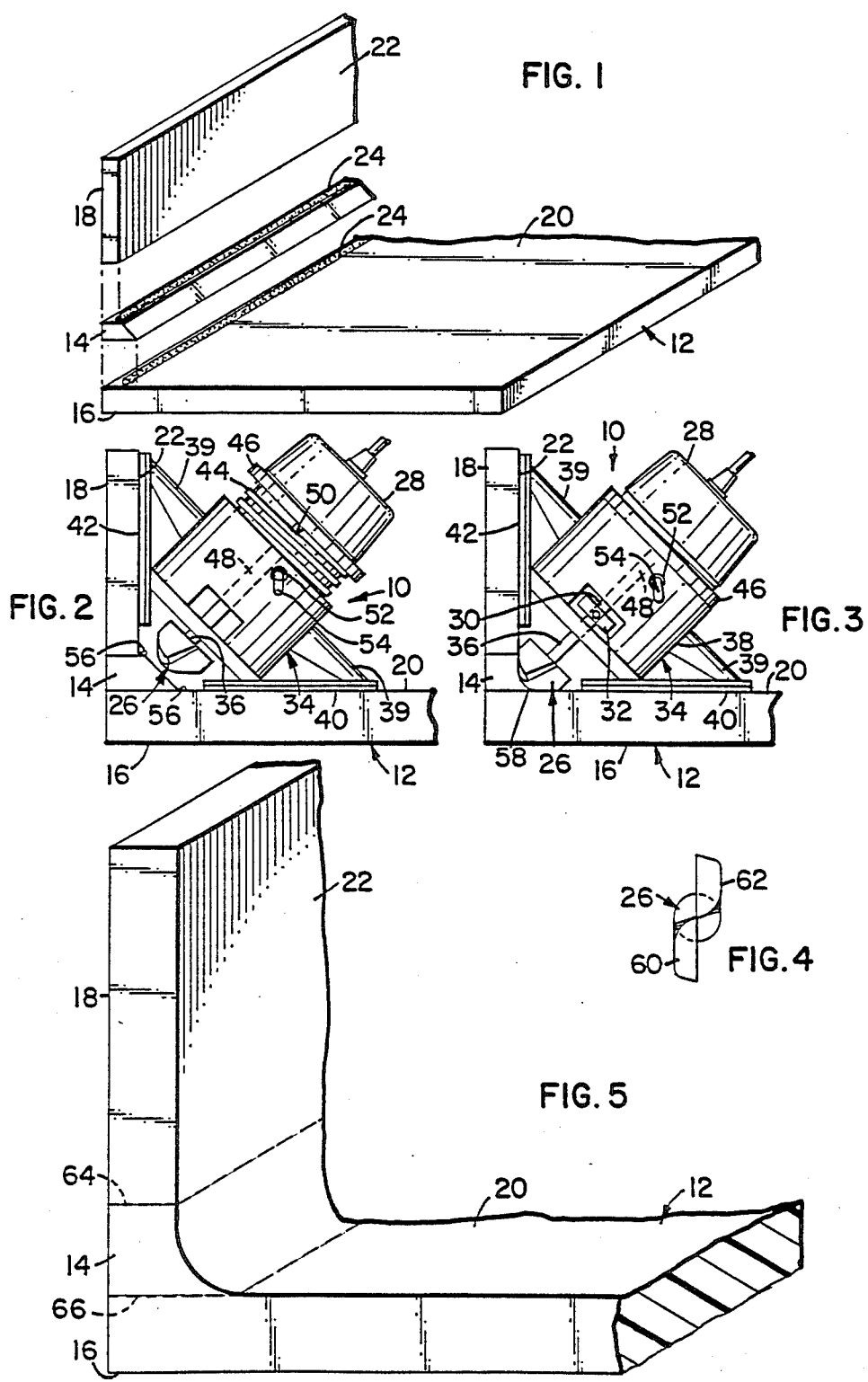

APPARATUS AND METHOD FOR MAKING A COUNTER TOP AND PRODUCT OF SAME

This is a continuation of application Ser. No. 560,318, filed Dec. 12, 1983, U.S. Pat. No. 4,608,291.

TECHNICAL FIELD

This invention relates to the apparatus and method for shaping a pair of sheets and a connecting member of a material of primarily filled polymethyl methacrylate into a counter top. The invention also relates to the counter top product of the process.

BACKGROUND OF THE INVENTION

Filled plastics are used for many products, and various methods for manufacturing such materials into variously shaped articles is well known. One such filled plastic material is simulated marble. Simulated marble products based primarily on filled polymethyl methacrylate are described in U.S. Pat. Nos. Re. 27,093; 3,488,246; 3,642,975; 3,663,493; 3,847,865; and 4,107,135. Some of these patents describe the use of various fillers to provide a variety of advantageous properties to the article, such as translucency, resistance to staining, flame resistance, machineability, resistance to stress cracking, etc.

Simulated marble products of the type indicated may be attractively processed and have become popular for use as industrial and home counter tops. Usually such counter tops have a flat horizontal slab and a smaller vertical backsplash slab which is glued to the horizontal slab to form a square inside corner. Edge pieces are sometimes glued to each of the slabs to improve counter top appearance.

It is recognized by the industry that an integral counter top with a rounded transition between the horizontal and vertical surfaces is particularly attractive and is advantageous for cleaning and, consequently, is often preferred by the consumer. Smaller sink counter top simulated marble products have been molded to form inside corners. The molding process, however, is not economical for larger products, and consequently, counter top products made from simulated marble and having a rounded inside corner are not available for most applications. Recently, a method for bending filled polymethyl methacrylate was developed by the patentee of the present invention. The method and apparatus for bending polymethyl methacrylate is described in detail in Ser. No. 476,506 filed Mar. 18, 1983. The bending process, however, is not available for applications having a molded sink as an integral part of the counter top.

Also, recently, the industry has been shown the use of a molded third member at the corner of horizontal and vertical counter top slabs. The molded third member has flat surfaces to abut the end edges of the horizontal and vertical slabs. The molded third member also has a concave arcuate transition between the flat sides so that when the third member is glued to the horizontal and vertical slabs, the assembly appears to have a rounded transition at the inside corner. The assembly process, however, is time consuming, and it is not uncommon that cracks between the various pieces are quite visible. Additionally, a glue bead at the cracks between the various pieces must be removed by sanding or other process.

SUMMARY OF THE INVENTION

The present invention is directed to an apparatus and process for shaping an inside corner of a counter top made from a filled polymer material. The present invention is directed also to the product resulting from use of the apparatus and method.

The counter top of the present invention includes first and second flat slabs. The first slab has a top surface, while the second slab has an end edge orthogonal to a front surface. A connecting slab having parallel upper and lower sides has an arcuate surface between the upper and lower sides. The counter top includes mechanism for fastening the connecting slab between the first and second slabs. In this fashion, the counter top has orthogonal front and top surfaces with an arcuate surface of the connecting slab mating with the top and front surfaces to form a rounded inside corner.

The method for making a counter top of the type described includes the steps of fastening the connecting slab between the horizontal and vertical orthogonal slabs, and sliding a rotating shaping tool across the connecting slab to arcuately shape the connecting slab to meet the flat top surface and the flat front surface of the horizontal and vertical slabs.

The apparatus for shaping the inside corner of the counter top of the type described by the method described includes a motor for rotating a shaft, a base for the motor, and a mechanism for attaching the base to the motor. The base has orthogonal plates for contacting the orthogonal surfaces of the horizontal and vertical slabs. The apparatus further includes a tool for cutting the connecting slab and a mechanism for attaching the tool to the shaft.

The present invention is particularly advantageous since a method and apparatus for use in the method is identified which results in a counter top with a rounded inside corner. Such method may be used for counter tops which cannot be bent, such as those which include a bowl formed in the counter top. Furthermore, the final product of the present invention does not depend on the skill of craftsmen matching surfaces and masking cracks in the prior art, but is a result of a repeatable process which yields a smooth, uniform rounded corner which does not have stress lines which could later result in cracks.

The present method and apparatus not only results in a beautiful, reliable product, but the method and apparatus used to make that product is simple and inexpensive.

These advantages and other objects obtained with this invention are further explained hereinafter with more particularity and by reference to the preferred embodiment as shown in the following drawings.

BRIEF DESCRIPTION OF THE DRAWINGS

FIG. 1 is an exploded, perspective view of a counter top before being shaped at the inside corner;

FIG. 2 is a side view of the counter top of FIG. 1 showing the shaping apparatus before adjustment for proper positioning of the shaping tool;

FIG. 3 is a side view similar to FIG. 2 showing the tool properly positioned for shaping the corner of the counter top;

FIG. 4 is an end view of a tool in accordance with the present invention; and

FIG. 5 is a perspective view of a portion of a counter top having a shaped inside corner in accordance with the present invention.

DETAILED DESCRIPTION OF THE PREFERRED EMBODIMENT

Referring now to the drawings wherein like reference numerals designate identical or corresponding parts throughout the several views, and more particularly to FIG. 3, an apparatus in accordance with the present invention and needed for the process of the present invention is designated generally as 10, while the counter top product of the invention is designated generally as 12.

As shown in FIGS. 1-3, the method for making a counter top in accordance with the present invention comprises fastening a connecting slab 14 having parallel upper and lower sides between horizontal and vertical orthogonal slabs 16 and 18, respectively. The horizontal slab 16 has a flat top surface 20, while the vertical slab 18 has a flat front surface 22. The fastening mechanism may be any appropriate fastening mechanism, although an adhesive 24 is recommended.

With slabs 14, 16 and 18 fastened together, the rotating shaping tool 26 of apparatus 10 is slid across connecting slab 14 to arcuately shape the connecting slab in order to meet the flat top surface 20 and the flat front surface 22 of the horizontal and vertical surfaces 20, 22.

The process of the present invention is applicable to slabs made from materials based on a mixture of a filler and polymers containing methyl methacrylate as the major monomer component. The preferred filler is alumina trihydrate although mixtures of other fillers with alumina trihydrate can be used. Other fillers could incude silica, alumina, calcium carbonate, $TiO_2$, ground mica and the like. The filler must be inert, i.e., a material substantially unaffected by the other ingredients present in the preparation of the resultant article. The polymer in the material can be methyl methacrylate homopolymer or a copolymer of methyl methacrylate with at least one other alpha, betaethylenically unsaturated compound (e.g., vinyl acetate, styrene, alkyl acrylates acrylonitrile, alkyl methacrylates, or multifunctional acrylic monomers, such as alkylene dimethacrylates and alkylene diacrylates, etc.) The ingredients and method of preparing a methyl methacrylate polymer material using alumina trihydrate filler is described in U.S. Pat. No. 3,847,865, hereby incorporated by reference. Commercial embodiments of filled polymer materials which are particularly applicable to the present invention are CORIAN (registered trademark of E. I. du Pont de Nemours and Company) building products. For CORIAN building products, the preferred adhesive 24 is "Rigid Joint Adhesive" made by E. I. du Pont de Numours and Company.

Apparatus 10 which is used in the inventive process for creating the inventive counter top 12 includes a motor 28 with a shaft 30 attachable to tool 26 at mechanism 32. Tool 26 is held in an appropriate position by base 34.

Motor 28 is preferably a commercially available motor for a router apparatus. Similarly, attachment mechanism 32 is any of a type commonly used, including those whereby a nut cams a plurality of wedges inwardly to hold the shaft 36 of a tool, like 26.

Base 34 includes a housing 38 for containing at least the drive end of motor 28. A pair of support arms 39 extend outwardly from opposite sides of housing 38. A first plate 40 is attached to the outer end of one of the support arms and to the lower end of housing 38 so as to form a 45 degree angle with the axis of shafts 30 and 36.

A second plate 42 is attached to the other support arm 39 and to the end of housing 38 on the side opposite from the attachment of plate 40 so that plates 40 and 42 are firmly held in an orthogonal relationship with both at a 45 degree angle to the axis of shafts 30 and 36 when base 34 is firmly affixed to motor 28.

Motor 28 includes circumferential grids 44 with a large nut 46 for rotating thereon. Base 34 is properly positioned by locating nut 46 at an appropriate place along threads 44. Base 34 is then inserted so as to butt against nut 46 such that slot 48 fits about protruberance 50 on nut 46. Set screw 52 is then tightened with lever 54 to hold base 34. The proper position base 34 occurs when tool 26 routs connecting slab 14 and beads 56 of adhesive on either side of connecting slab 14 so as to create an arcuate surface which just meets flat top and front surfaces 20 and 22.

Tool 26 has a shaft 36 and a head 58. Head 58 includes a pair of wings 60 and 62 extending outwardly from and on opposite sides of shaft 36. The leading edges of wings 60 and 62 are sharpened from the axis outwardly to provide the cutting edges. The cutting edges of tool 26 are shaped to provide a curvature symmetrical on either side of the axis, which curvature ends in a straight cut wherein the straight cuts are orthogonal with respect to each other. Thus, when tool 26 is properly positioned, apparatus 10 may be slid along slabs 16 and 18 allowing tool 26 to provide an arcuate surface in connecting slab 14 such that the arcuate surface meets the top and front surfaces 20 and 22 of slabs 16 and 18, respectively.

Thus, although the mating cracks 64 and 66 of connecting slab 14 with horizontal slab 16 and vertical slab 18 are shown in FIG. 5, such cracks are not apparent in a finished product counter top 12 as illustrated in FIG. 5.

In use, connecting member 14 is fastened with adhesive 24 to the top rear surface of slab 16, usually having a molded basin (not shown) therein, and to the bottom edge of an upright slab 18. After the glue sets, apparatus 10 is placed at the inside corner of counter top 12. The location of tool 26 is adjusted by loosening set screw 52 with lever 54 and moving motor 28 as appropriate. When the proper location for tool 26 is determined, as shown in FIG. 3, nut 46 is rotated to provide a stop for the indicated position of motor 28 and tool 26 relative to base 34. Base 34 butts against nut 46 so that slot 48 fits about protruberance 50. Set screw 52 is then tightened at lever 54 to secure the desired relationship of the parts. With motor 28 operating, apparatus 10 is then slid along counter top 12 so that tool 26 routs a portion of connecting member 14 and removes beads 56.

As indicated hereinbefore, the process and apparatus 10 of the present invention is particularly advantageous for horizontal slabs 20 having a molded bowl or other molded protruberance thereon or therein. Such slabs may not be easily bent. The prior art has taught only time consuming methods resulting in somewhat unattractive finished products when a backsplash slab is provided for such a horizontal slab. Consequently, the present process and apparatus provides a product not heretofore available for materials comprised primarily of methyl methacrylate polymers with alumina trihydrate fillers.

Although characteristics and advantages, together with details or structure, function and process steps, have been described in reference to a preferred embodiment herein, it is understood and that the disclosure is illustrative. To that degree, various changes made, especially in matters of shape, size and arrangement, to the full extent extended by the general meaning of the terms in which the appended claims are expressed, are within the principle of the present invention.

What is claimed is:

1. A method for making a counter top comprising the steps of:

fastening a connecting slab between horizontal and vertical orthogonal slabs, said horizontal slab having a flat top surface and said vertical slab having a flat front surface; and sliding a rotating shaping tool across said connecting slab to arcuately shape said connecting slab to tangentially meet the flat top surface and the flat front surface of said horizontal and vertical slabs.

* * * * *

Disclaimer

4,711,799—*Gene G. Gove*, Hastings, Minn. APPARATUS AND METHOD FOR MAKING A COUNTER TOP AND PRODUCT OF SAME. Patent dated Dec. 8, 1987. Disclaimer filed May 9, 1991, by the inventor.

The term of this patent subsequent to Aug. 26, 2003, has been disclaimed.
[ *Official Gazette August 27, 1991* ]